April 18, 1933. G. E. ZAHN 1,904,811
HYDRAULIC TRANSMISSION MECHANISM
Filed Dec. 27, 1930 3 Sheets—Sheet 1
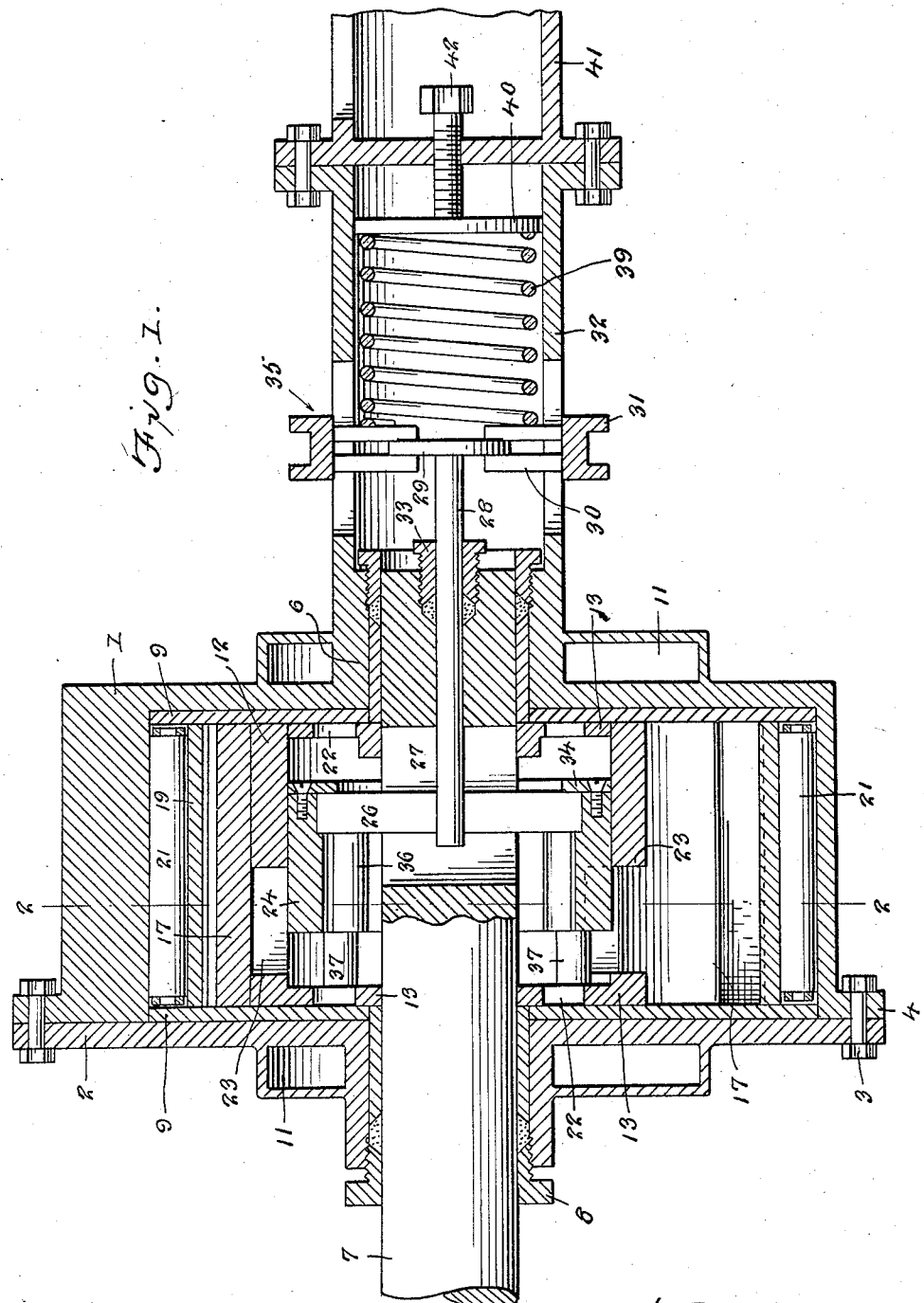

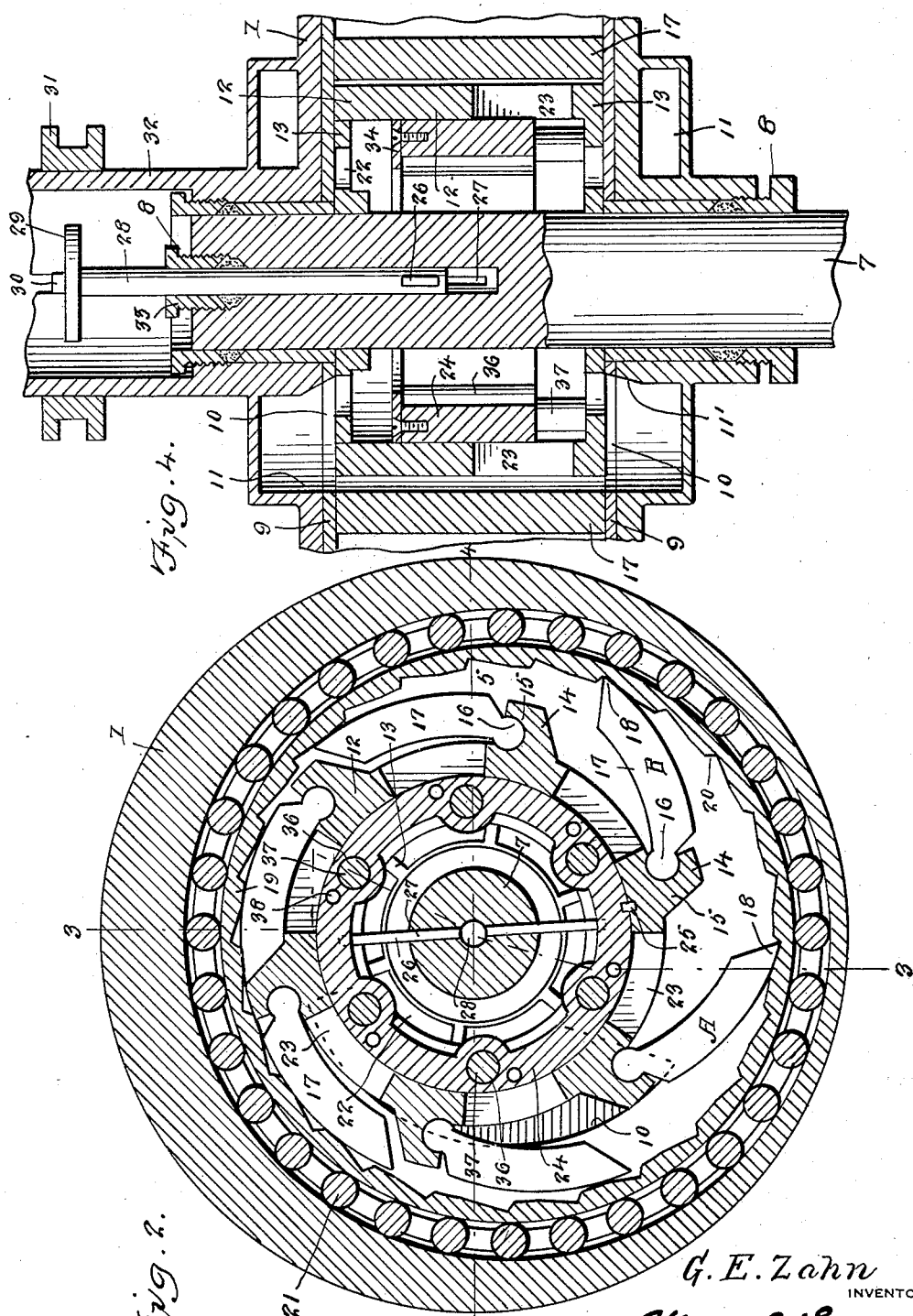
April 18, 1933.     G. E. ZAHN     1,904,811
HYDRAULIC TRANSMISSION MECHANISM
Filed Dec. 27, 1930     3 Sheets-Sheet 2

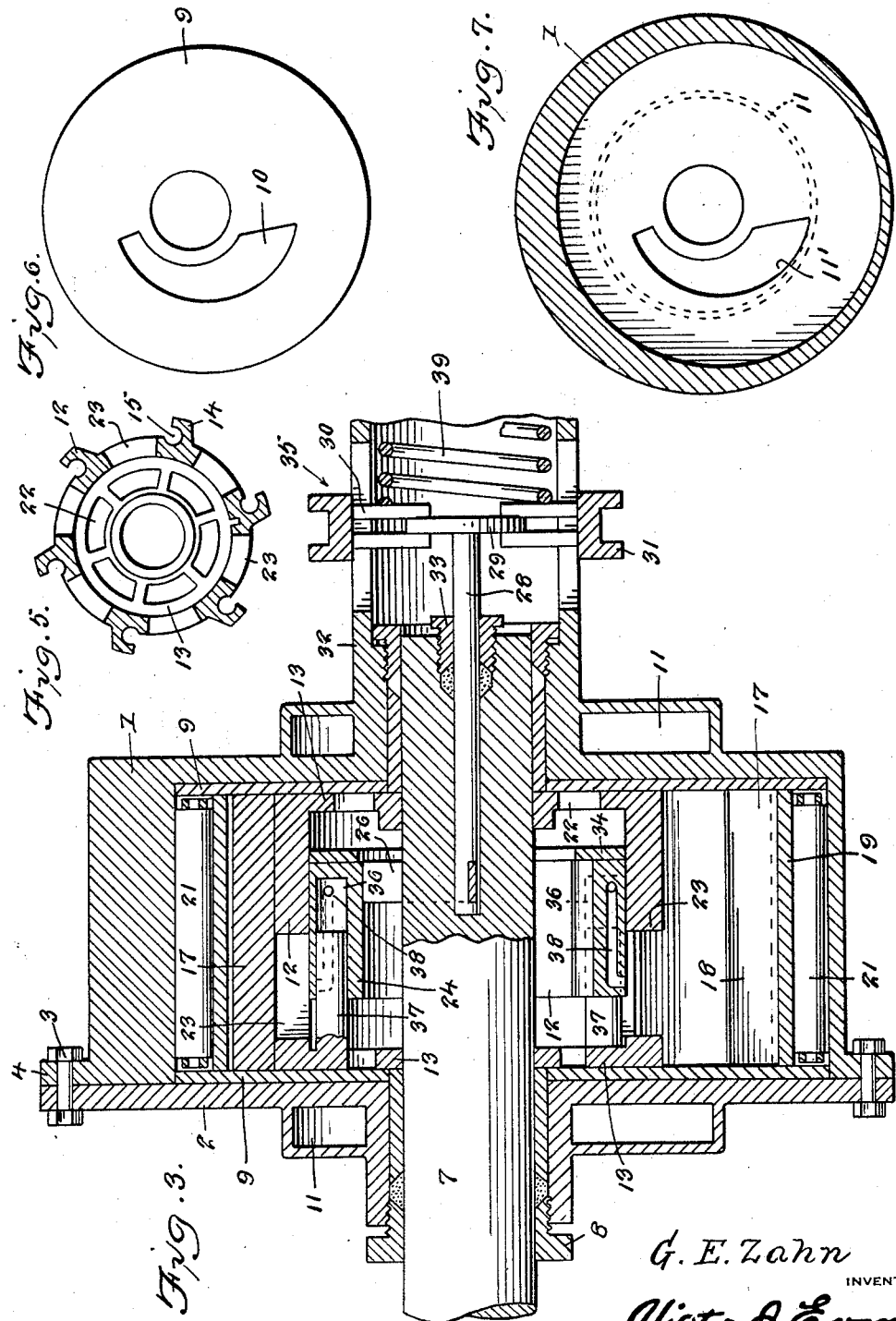

Patented Apr. 18, 1933

1,904,811

UNITED STATES PATENT OFFICE

GEORGE EUGENE ZAHN, OF FREEDOM, PENNSYLVANIA

HYDRAULIC TRANSMISSION MECHANISM

Application filed December 27, 1930. Serial No. 505,153.

This invention relates to improvements in rotary pistons for hydraulic transmissions, brakes, pumps and the like, and transmissions of the type forming the subject-matter of my co-pending application filed September 9, 1929, and Serial No. 391,263, and has for the primary object, the provision of a device of the above stated character which is rotatably mounted in the eccentric chamber of the transmission for the wings of the drive member to engage to reduce friction to a minimum when the driven device is idling relative to the power shaft or rotating at a slower rate of speed than the power shaft and which will establish a direct drive connection between the drive member or the wings thereof and the driven member when the pressure has been built up sufficient to bind the piston against the walls of the eccentric chamber forming a part of the driven member.

Another object of this invention is the provision of a device of the above stated character which may be employed in connection with any device employing a rotor for the purpose of reducing friction to a minimum.

A further object of this invention is the provision of a fluid transmission of the above stated character which will be simple, durable and efficient and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which Figure 1 is a sectional view illustrating a fluid transmission constructed in accordance with my invention.

Figure 2 is a transverse sectional view taken on the line 2—2 of Figure 1.

Figure 3 is a sectional view taken on the line 3—3 of Figure 2.

Figure 4 is a sectional view taken on the line 4—4 of Figure 2.

Figure 5 is a detail sectional view illustrating a portion of the driving element.

Figure 6 is a side elevation illustrating one of the end wear plates.

Figure 7 is a transverse sectional view illustrating one end of the casing.

Referring in detail to the drawings, the numeral 1 indicates a housing or casing which is suitably connected to a device to be driven and has a removable side wall 2 detachably secured by fasteners 3 to an annular flange 4 on the casing and the casing has formed therein an eccentric chamber 5 as clearly shown in Figure 2. The side walls of the casing 1 are provided with concentrically located journals or bearings of any well known type which rotatably receive a drive or power shaft 7. Suitable stuffing boxes 8 are provided between the shaft 7 and the journals 6 to provide a leak-proof connection between the driven casing and the shaft 7 for preventing escape of fluid from the interior of the casing. Wear plates 9 are located against the side walls of the casing and are provided with arcuate shaped ports 10 communicating with by-pass chambers 11 and ports 11' formed on the exterior faces of the end plates or walls of the casing 1.

An annular drive member 12 having end walls 13 secured to the shaft 7 within the chamber 5 of the casing has formed on the periphery a plurality of spaced ears 14 having sockets 15 to receive rounded ends 16 of wings 17. The wings 17 have their free ends bevelled to provide biting ends 18 for engagement with an annular drive piston or ring 19 located against the inner wall of the casing 1 or within the eccentric chamber 5. The wings 17 are mounted for free pivotal movement and their biting ends 18 engage notches or grooves 20 formed in the piston or ring 19 during certain operations of the device. By reference to Figure 2 it will be seen that a plurality of grooves or notches 20 are provided on the inner periphery of the piston or ring 19 and extend parallel with the axis thereof. Anti-friction means 21 which may be in the form of balls, rollers or a film of fluid, is interposed between the outer periphery of the piston or ring 19 and the eccentric wall of the chamber 5, thus it will be seen that the piston or ring 19 may have a floating action within the chamber 5 or rotate freely relative to the casing 1 when the latter is idle.

The end walls 13 of the drive member 12 are provided with ports 22 which communicate with the interior of the by-pass chambers 11 by suitable ports 10 and 11' in the wear plates 9 and by-pass chambers 11 for the purpose of relieving the pressure against the stuffing boxes 8 during the operation of the drive. The drive member 12 is provided with ports 23 in the pheriphery thereof and between the ears 14 as shown in Figure 2 so that the wings 17 overlie the said ports 23.

The ports 23 establish communication between the interior of the drive member 12 and the chamber 5 of the casing 1 and are controlled by a slidable and cylindrical shaped valve 24 located within the drive member 12 and is splined to the drive member 12 by a key 25 so that the valve will rotate with the drive member 12 from the power shaft 7. By adjusting the valve 24 relative to the ports 23, the passage of fluid through said ports can be regulated and the valve is connected to a member 26 which extends through a slot 27 in the shaft 7 and is connected to a rod 28 slidably mounted in a bore of the shaft 7 and is provided at its outer end with a head 29 journalled between spaced flanges 30 formed on a collar 31 journalled and slidably mounted on a sleeve 32 forming a part of one of the journals 6. The collar 31 is of the grooved type to which a suitable operating means of the manual control type may be connected for the purpose of varying the position of the valve 24 relative to the ports 23. A stuffing gland 33 engages the rod 28 and is located in the bore of the shaft 7 for the purpose of establishing a leak-proof connection between the rod 28 and the shaft 7. The bar 26 has its ends seated within a groove formed in the valve 24 and is retained in the groove by a removable plate 34.

When it is desired that the casing 1 idle relative to the power shaft 7 during the latter's rotation, the valve 24 is positioned to permit the free passage or circulation of the fluid through the ports 23 thereby preventing the pressure between certain of the wings from being built up and the piston or ring member 19 rotates freely within the chamber 5 and to cause a rotation of the casing 1 at the same rate of speed with the shaft 7 or to cause the casing 1 to rotate in unison with the shaft 7, the valve is positioned to close the ports 23 causing fluid to be trapped between a certain pair of wings 17 and the drive member and walls of the chamber 5, which trapped fluid exerts pressure in all directions and will bind the piston or ring 19 against the wall of the chamber 5 causing the casing 1 to rotate in unison with the shaft 7. To rotate the casing 1 at a less number of revolutions per minute than the revolutions of the shaft 7, the valve 24 is positioned to partially open the ports 23 permitting a certain amount of fluid to pass therethrough which reduces the pressure of the trapped fluid between certain of the wings 17 thereby allowing a certain amount of slippage between the piston 19 and the casing 1.

By reference to Figure 2 it will be seen that the device rotates in a counter clockwise direction and the two lowermost wings which are in engagement with the notches 20 of the piston or ring 19 form a chamber in which the fluid pressure is built up. When the casing 1 is idle or rotating at a slower rate of speed than the shaft 7 the piston or ring 19 moves faster than the shaft 7 owing to the arrangement of the wings within the eccentric chamber 5. It will be noted that the wing A which is the lowermost wing of the group of wings in Figure 2 moves in the arc of a circle when advancing from the position shown in Figure 2 to the position as shown at B which causes the piston or ring 19 to rotate or advance a little more rapidly than the shaft 7. The wing A in the position shown in Figure 2 occupies a position wherein the free end is disposed a greater distance outwardly than the free ends of the remaining wings and as this respective wing advances toward the position B the free end thereof swings inwardly and this inward movement causes a faster rotation of the ring or piston 19 than the rotation of the shaft 7 consequently the remaining wings ratchet over the ring or piston or slightly lag behind the rotation of the ring or piston. By reference to Figure 2 it will be seen that the uppermost wings are forced inwardly and lie in close proximity to the outer periphery of the drive member 12 and as the respective wings arrive opposite to the arcuate-shaped ports 10 owing to centrifugal force and the shape of the chamber 5 swing outwardly of the drive member 12 and engage in a notch or groove 20 when arriving at the position occupied by the wing A in Figure 2 permitting fluid to enter from the ports 10 and 11' and be trapped between a pair of wings and the walls of the device and with the valve 24 in an open position the trapped fluid may pass through the respective port 23 and prevent pressure from being built up. However should the valve be closed the fluid trapped is then compressed establishing the necessary force to bind the ring or piston 19 against the wall of the chamber 5 and cause rotation of the casing 1 in unison with the shaft 7.

The grooves 20 are a very important part of this invention as they give the wings a positive grip on the piston or ring 19 and at the same time form a seal that the fluid may not escape by the ends of the wings and only escape in the desired amount through the ports 23.

Another important feature of this device is that the piston or ring 19 moves faster than the drive member 12 when the casing 1 is rotating at a slower rate of speed than the power shaft 7 or when idling relative to the shaft 7. The free ends of the wing at the position A and the wing at the position B as shown in Figure 2, are further apart than the ends of any other two successive wings in the circle so that as the wing at the position A and the wing occupying the position B advance, the free end of the wing at the position A will have travelled farther than the free end of any of the other wings; thus it is evident that the other wings lag back of the advancing piston or ring 19 and continue to lag back until they reach the position occupied by the wing at the position A in Figure 2 and then take their turn at advancing said piston or ring which provides a two fold advantage in that the compression area is always from the farthest open wing forwardly which causes a maximum pressure area dividing the load over the greatest possible bearing surface and also releases the load on the preceding wings allowing them to lag back to a point where they engage with a minimum of wear.

From the foregoing it will be seen that friction is reduced to a minimum by the employment of the rotating ring or piston 19.

To render the device automatic for the purpose of rotating the casing 1 at the same rate of speed as the power shaft 7, up to a predetermined load or resistance on the casing 1, a control 35 is provided and the valve 24 is provided with a plurality of cylinders 36 opening outwardly through one end thereof and receiving non-movable pistons 37 carried by one of the end walls of the drive member 12 and the inner ends of the cylinders 36 communicate with passages 38 leading to the interior of the drive member 12 adjacent the ports 23 for the purpose of admitting fluid pressure within the cylinders in accordance with the fluid pressure within the drive member 12 and that passing through the ports 23. A tension spring 39 forming a part of the control 35 bears against the flanges 30 of the collar 31 and against an adjustable head 40 carried by a support 41 secured to the sleeve or extension 32.

The head 40 is secured to an adjusting bolt 42 having threaded engagement with the support 41 whereby the tension of the spring 39 may be varied. The spring 39 is adjusted to withstand a certain pressure which is equal to a predetermined resistance or load on the member 1 and when the load or resistance on the member 1 increases beyond the determined amount, the pressure of the fluid trapped within the chamber confined by the respective pair of wings and walls of the device increases, the same pressure will be against the pistons 37 by way of the passages 38 causing an endwise movement of the valve 24 increasing the size of the ports 23 and allowing a greater amount of fluid to escape therethrough, thereby reducing the pressure of the ring or piston against the walls of the chamber 5 and permitting a slippage between said parts and a slower rotation of the casing 1 and when the load or resistance decreases to the predetermined amount, the spring 39 moves the valve 24 in an opposite direction again retarding the flow of the fluid through the ports 23 and permitting the desired pressure to be again built up between the respective wings and walls of the device to again cause rotation of the casing 1 in unison with the shaft 7.

While I have shown and described the preferred embodiment of my invention it will be understood that minor changes in construction, combination and arrangement of parts may be made wthout departing from the spirit and scope as claimed.

Having thus described my invention, what I claim is:

1. A fluid transmission including a fluid casing forming a part of a driven device and a power shaft extending into the casing concentrically thereof, said casing having an eccentrically located chamber in which the shaft is eccentrically located, a rotary element engaging the wall of said chamber, a drive element secured to the shaft, wings pivoted to the drive element to successively engage the rotary element during the rotation of the drive element, and a fluid control means to trap fluid between the walls of the chamber and certain of a pair of wings to build up desired pressures for rotating the casing from the shaft through the rotary element.

2. A fluid transmission including a fluid casing forming a part of a driven device and a power shaft extending into the casing concentrically thereof, said casing having an eccentrically located chamber in which the shaft is eccentrically located, a rotary element engaging the walls of said chamber and having relatively spaced grooves, a drive element secured to the shaft, wings pivoted to the drive element to successively engage with their free ends in the grooves of the rotary element during the rotation of the drive element, a control valve to trap fluid between the walls of the chamber, and a pair of wings to build up varying pressures of fluid for rotating the casing from the shaft through the rotary element at variable speeds of rotation relative to the speed of rotation of the shaft.

3. A fluid transmission including a fluid casing forming a part of a driven device and a power shaft extending into the casing concentrically thereof, said casing having an eccentrically located chamber in which the shaft is concentrically located, an annular element located in said chamber and having relatively spaced notches in its inner face, anti-friction means between the walls of the chamber and the annular element, a cylindrical drive element secured to the shaft and having relatively spaced ports in the periphery thereof, wings pivoted to the periphery of said cylindrical element and having the pivoted ends thereof located between said ports, said wings adapted to close the ports when in one position and when in another position to engage the notches of the annular element, and a fluid control means for the ports to trap fluid between the walls of the chamber and certain of a pair of wings to build up desired pressures for rotating the casing from the shaft through said cylindrical element.

In testimony whereof I affix my signature.

GEORGE EUGENE ZAHN.